US012721476B1

(12) United States Patent
Phillips

(10) Patent No.: US 12,721,476 B1
(45) Date of Patent: Sep. 1, 2026

(54) ACCESSORY FOR COOKING PIZZA AND OTHER FOODS ON AN OUTDOOR GRILL

(71) Applicant: Kirt Anthony Phillips, Washougal, WA (US)

(72) Inventor: Kirt Anthony Phillips, Washougal, WA (US)

(*) Notice: Subject to any disclaimer, the term of this patent is extended or adjusted under 35 U.S.C. 154(b) by 976 days.

(21) Appl. No.: 17/698,046

(22) Filed: Mar. 18, 2022

Related U.S. Application Data

(60) Provisional application No. 63/164,879, filed on Mar. 23, 2021.

(51) Int. Cl.
*A47J 37/07* (2006.01)

(52) U.S. Cl.
CPC .... *A47J 37/0786* (2013.01); *A47J 2037/0795* (2013.01)

(58) Field of Classification Search
CPC ..................... A47J 37/0786; A47J 2037/0795
USPC ............................................................ 99/340
See application file for complete search history.

(56) References Cited

U.S. PATENT DOCUMENTS 4,378,729 A 4/1983 Pierick
4,955,125 A 9/1990 Steinman
5,365,833 A 11/1994 Chen
5,523,104 A 6/1996 Kirk
6,054,697 A 4/2000 Woodward et al.
6,187,359 B1 2/2001 Zuccarini
6,640,695 B2 11/2003 Stark
7,219,663 B2 5/2007 Cuomo
8,430,088 B1 4/2013 Gallaher
D764,868 S 8/2016 Zuccarini
10,085,595 B2 10/2018 Minnich
10,132,502 B2 11/2018 Contarino, Jr.
10,238,236 B2 3/2019 Borovicka et al.
10,405,699 B2 * 9/2019 Contarino .............. A47J 37/07
10,575,680 B2 3/2020 Fagg et al.
10,687,667 B2 6/2020 Contarino, Jr.
D893,256 S 8/2020 Pruitt et al.
10,827,878 B2 11/2020 Baker
10,876,738 B2 12/2020 Touma
2005/0003961 A1 * 1/2005 Denny ..................... A23L 1/00 99/450
2005/0039612 A1 2/2005 Denny
(Continued)

FOREIGN PATENT DOCUMENTS

WO WO2015111985 A1 7/2015

*Primary Examiner* — Ibrahime A Abraham
*Assistant Examiner* — Solan Oliva
(74) *Attorney, Agent, or Firm* — Howard Russell; Cera Oh

(57) ABSTRACT

Portable cooking accessory apparatus for facilitating cooking of food items when used with a cooking member, such as a baking stone, a metal sheet, or an oven-style rack, on an outdoor grill having a hood cover, comprising: a plurality of base member adapted for resting on the grill above a heat source of the grill, a plurality of support members attached to the base members and extending away from the heat source, the support members adapted for holding the cooking member in one or more elevated positions relative to the heat source, the support members further adapted for reducing heated air from directly accessing a bottom surface of the cooking member while enabling heated air to move from the heat source to over a top surface of the cooking member and between the hood cover and the top surface of the cooking member.

18 Claims, 11 Drawing Sheets

(56) References Cited

U.S. PATENT DOCUMENTS

| | | | | |
|---|---|---|---|---|
| 2008/0295703 | A1 | 12/2008 | Chen | |
| 2010/0294138 | A1 | 11/2010 | Bryce et al. | |
| 2014/0366865 | A1* | 12/2014 | Haberman | A47J 37/0772 |
| 2015/0289719 | A1* | 10/2015 | Contarino | A47J 37/0786 |
| 2016/0227965 | A1 | 8/2016 | Johnston et al. | |
| 2017/0020337 | A1 | 1/2017 | Borovicka et al. | |
| 2018/0110367 | A1 | 4/2018 | Baker | |
| 2019/0231144 | A1* | 8/2019 | Cook | A47J 37/07 |

* cited by examiner

ACCESSORY FOR COOKING PIZZA AND OTHER FOODS ON AN OUTDOOR GRILL

CROSS REFERENCE TO RELATED APPLICATION

This US Nonprovisional Patent Application claims the priority and benefit of U.S. Provisional Patent Application Ser. No. 63/164,879 filed Mar. 23, 2021.

FIELD OF THE INVENTION

The present invention relates to cooking accessories for use with outdoor grills, and more particularly to a portable accessory that may be used with a baking stone, or other cooking member, and in conjunction with an existing outdoor grill of any fuel type for improved baking of pizzas and other foods requiring even-heat distribution, whether cooking is desired at higher temperatures such as is often preferred for pizza, or at lower temperatures for smoking meats and vegetables.

BACKGROUND OF INVENTION

Outdoor grills are commonly used to cook, smoke, and warm various food items, including various types of meats and vegetables, hamburger and hotdog buns, pizza, and other food items to be warmed or smoked. There are several benefits to outdoor cooking on a grill, as opposed to a traditional indoor oven, such as the ease of adding smoke and other flavorings, while also minimizing cleanup requirements. Outdoor cooking on a grill is a very popular means for food preparation.

Pizzas are typically cooked in a brick pizza oven, specially adapted with heat generated at the floor of the oven, but wherein the heat is most intense at the top of the oven. However, persons have desired to cook pizzas, as well as other foods, using an outdoor grill. According to the prior art, pizzas and other foods have been cooked directly on outdoor grills, and such foods have also been cooked on a baking stone placed on the grill. However, a problem has arisen in that the food, such as for example a pizza, has been placed very close to the grill using some prior art methods, and thus the bottom of the pizza has invariably been cooked more quickly than the top of the pizza, resulting at best in an unevenly cooked pizza, and at worst a burnt and thus inedible pizza.

Some cooks have propped up a baking stone on bricks or other inflammable spacers to achieve a more even heat application to both the top and bottom of food, such as a pizza, to be cooked on the baking stone. While this has provided some improvement in heat distribution, the baking stone has still received an unduly large proportion of available heat generated by the grill, largely since the stone has blocked the upward flow of heated air so as to have absorbed too much heat and to have blocked the heated air from flowing over the top of the food at the top of the grill. This, in turn, has resulted in failure to achieve optimal heat distribution preferred for pizza baking and warming of other food items using a grill.

Some prior products, sometimes having been used independent of an existing outdoor grill, have provided outdoor pizza ovens that have contained their own source of fuel and have provided more even heat distribution for evenly cooking and warming such food items. However, these products are expensive, have required users to maintain another appliance with another fuel source, have required sensitive adjustment to attain even heat distribution, and have comprised additional bulky items to store when not in use.

SUMMARY OF THE INVENTION

In accordance with an aspect and embodiment of the disclosure, there is provided a portable cooking accessory apparatus adapted for facilitating ideally heating or smoking of food items (i.e., cooking or warming the food to a desired temperature throughout and without overcooking or burning a portion of the food) when used with a heatable cooking member, such as a typical ceramic baking stone, a metal cooking member or sheet, or another material cooking member, on an outdoor grill or other cooking surface having a hood cover. The apparatus comprises: at least one base member adapted for resting stably on the grill or other cooking surface above a heat source of the outdoor grill or other cooking surface, and a support member attached to the at least one base member and extending away from the at least one base member and the heat source, the support member adapted for holding the cooking member in an elevated position relative to the heat source, the support member further adapted for reducing heated air from directly accessing a bottom surface of the cooking member while enabling heated air to move from the heat source to over a top surface of the cooking member and between the hood cover and the top surface of the cooking member.

In an embodiment of this aspect of the disclosure, preferably the base member of the portable cooking accessory apparatus further comprises a plurality of elongated members, each elongated member having a flat horizontal surface for resting on the grill or other cooking surface, and each elongated member extending upwardly from the flat horizontal surface to form an upright rail portion adapted for interconnecting with the support member.

Further, in accordance with an embodiment of the portable cooking accessory apparatus of this aspect of the disclosure, the support member preferably comprises a plurality of angularly-oriented heat-deflecting support member panels each support member panel having a lower portion and an upper portion. Still further, in accordance with this embodiment, preferably each support member panel is adapted for being attached at its lower portion to each upright rail portion of each of the plurality of elongated members. In this embodiment, each upper portion of each support member panel is supported and retained in an elevated position relative to each base member by at least one support arm, and each upper support portion is adapted for supporting the cooking member in an elevated position relative to the heat source.

In accordance with another aspect of the disclosure, preferably the portable cooking accessory apparatus is collapsible and optionally adapted for holding the cooking surface in a first elevated position and a second lowered position, allowing cooking at different levels while using the apparatus. In accordance with another aspect and embodiment of the disclosure, there is provided the capability for positioning the apparatus, and thus the cooking member, at a plurality of different heights.

In an embodiment, the upright rail portion of at least one of the plurality of base members has formed therein an outer retaining slot at an outer longitudinal extent of the upright rail portion. Further, the upright rail portion of at least one of the plurality of base members has formed therein at least one retaining hole centrally located in the upright rail portion for pivotably retaining the lower portions of each support member. Still further, the upright rail portion of at least one of the plurality of base members has formed therein an intermediate retaining slot located between the outer retaining slot and the retaining holes.

In accordance with an embodiment of the portable cooking accessory apparatus, preferably each upright rail portion of each base member has formed therein an outer retaining slot at each outer longitudinal extent of, that is at each end of, each base member. Further, in this embodiment, preferably each upright rail portion of each base member has formed therein a plurality of retaining holes centrally located in the upright rails for pivotably retaining the lower portions of each support member. Still further, preferably each upright rail portion of each base member has formed therein a plurality of intermediate retaining slots located between the outer retaining slots and the retaining holes of the upright rail portions of each elongated base member. In yet another embodiment, there may be provided an additional plurality of intermediate slots to allow for adjustability of the height of the cooking member relative to an inner upper surface of the hood cover.

Further, in accordance with this embodiment of the disclosure, preferably the portable cooking accessory apparatus provides that each support member panel further comprises side rails extending alongside the length of each support member panel, wherein each support member is pivotably attached between the side rails of the support member and the upright rail portion of each base member at the centrally located retaining holes of each rail portion and adjacent the lower portion of each support member.

Further, in accordance with this embodiment, preferably each at least one support arm comprises a substantially U-shaped arm member having an inwardly extending stub at each upper extent of the U-shaped arm member, and each stub is adapted for being pivotably retained in each side rail adjacent the upper portion of each support member panel. Further, in accordance with this embodiment, the lower extents of the U-shaped arm members are optionally, or alternatively, adapted for being retained during elevated support of the cooking member in the retaining slots at the outermost extents of the elongated base members, and being retained during lowered support of the cooking member, or storage of the apparatus, in the plurality of intermediate slots of the elongated base members.

In an embodiment of the disclosure, the portable cooking accessory apparatus preferably comprises an upwardly extended position of the plurality of support members wherein the cooking member is adapted for being supported at least on the stubs of the U-shaped support arms and wherein in a lowered position of the plurality of support panel members the cooking member is adapted for being supported on the stubs of each U-shaped support arm and the lower extent of each U-shaped support arm (as the U-shaped support arm has been pivoted to a flattened, non-elevated, configuration), wherein the lower extent of each U-shaped support arm is retained in the intermediate slots.

Further, in accordance with another aspect and embodiment of the disclosure, there is provided the capability for positioning the apparatus, and thus the cooking member, at a plurality of different heights.

In an elevated position of an embodiment of the portable cooking accessory apparatus, the support members generally form a V-shaped structure for deflecting and re-directing heat from the heat source to and above outer upper extents of the apparatus to effectively reduce the amount of heat directly accessing a lower surface of the cooking member, and to effectively route heat to above the cooking member, with heating potential naturally rising and being directed to a location between the cooking member and the hood cover.

In an embodiment of the portable cooking accessory apparatus, there is preferably further provided an end lip (or flange) along an outermost end of each support member panel. In accordance with this embodiment, this lip helps secure the cooking member when in an elevated position. Further, the support member panels are adapted for retaining the cooking member in a storage position with the stubs of each U-shaped support arm adapted for engaging a top surface of the cooking member, near the edge thereof, for retaining the cooking member in the storage position. Still further, preferably in accordance with this embodiment, in such a storage position the lower extent of each U-shaped support arm is also adapted to be pivoted into a flattened position for retaining the cooking member in the storage position with the lower extent of each U-shaped support arm engaging the top surface of the cooking member while the lower extent of each U-shaped support arm is also retained in an intermediate slot of the upright vertical portion of each elongated base member.

In another embodiment, arm-type support members are provided comprising flat bars with hole on one end, the flat bars attaching to the flanges of the side panels through pin-type connections, the flat bars attach on the other end of the bar to the upright portions of the base members by pin and slot, or other pin, connections designed for easy attachment or detachment for collapsing the assembly quickly and reducing needed storage space.

Further, in an embodiment, a rod (not shown) may be employed to extend from one support member to the other, i.e., by extending between the aforementioned stubs of the generally U-shaped arms, each rod spanning each panel member, and secured by a nut or other type of common attachment such as a hole, insert, a pivotable force-fit insertion, and/or a kotter-pin-type clip. Thus, each rod may be placed so that in the operational configuration it will support a baking stone, a baking sheet, or a oven-style wire rack, placed on the top of the assembly. Further, in any of the foregoing embodiments, an optional V-shaped, water-retaining, pan may be adapted for retaining wood chips for smoking or water for steaming.

In another embodiment, the aforementioned rod, or rods, may be replaced by support tabs or other methods of support common in the art. Other structural members connecting the support members may be included to provide additional structural strength and support. The support member panels, base members, and other support members and connection hardware may be made of stainless steel or other heat and rust tolerant material. The flanges on some or all sides of the support member panels add structural strength and assist in the attachment of other support members as further described herein.

Thus, the presently claimed device describes an apparatus for use on an existing outdoor grill of any fuel type that solves the issues associated with prior-art apparatus. The present apparatus improves on prior art apparatus, since it emulates the ideal conditions of a traditional brick oven pizza oven, but allows for such ideal pizza (and other food) cooking conditions with virtually any outdoor grill. The assembly forming a "V" shaped apparatus thus supports and elevates a baking stone, a backing sheet, or an oven-style rack, located at the top of the assembly. It achieves optimal heat distribution through the combination of the baking stone being positioned closer to the top of the grill as well as by the "V" shaped assembly supporting it and directing the flow of heat from the grill away from the bottom of the cooking member and to the top of the grill near the hood cover. With the grill hood closed, the heat is directed downward onto the top of the food being cooked, such as a pizza, for even cooking of the food.

When not in use, the claimed apparatus is designed to collapse to a much smaller profile for easy and convenient storage requiring much less space than competitive products currently on the market. The apparatus also requires few parts and no additional fuel source other than an existing outdoor grill 800 (which is already owned by the majority of households) thus being more cost effective than competitive products.

In accordance with another aspect and embodiment of the disclosure, there is provided a portable combination cooking accessory apparatus and cooking member (such as a typically ceramic baking stone, a metal cooking member, an oven-style rack, or other material cooking member) adapted for facilitating even heating or smoking of food items when used on an outdoor grill or other cooking surface having a hood cover. The embodiment of this aspect of the invention comprises: at least one base member adapted for resting on the grill or other cooking surface above a heat source of the outdoor grill or other cooking surface, and a cooking member, such as a baking stone, a metal sheet, or an oven-style rack, adapted for being optionally held in a cooking position or a storage position.

The combination apparatus and cooking member of this aspect of the disclosure further comprises a support member attached to the at least one base member and extending away from the at least one base member and the heat source, the support member adapted for holding the cooking member in an elevated position relative to the heat source, the support member further adapted for reducing heated air from directly accessing a bottom surface of the cooking member while enabling heated air to move from the heat source to over a top surface of the cooking member and between the hood cover and the top surface of the cooking member.

In a preferred embodiment of this aspect of the disclosure, there is provided a portable combination cooking accessory apparatus and cooking member, wherein the base member further comprises a plurality of elongated members each having a flat horizontal surface for resting on the grill or other cooking surface, and each elongated member extending upwardly from the flat horizontal surface to form an upright rail portion adapted for interconnecting with the support member.

Further, in accordance with this embodiment, the portable combination cooking accessory apparatus and cooking member support member comprises a plurality of angularly-oriented heat-deflecting support member panels each support member panel having a lower portion and an upper portion, each support member panel being attached at its lower portion to each upright rail portion of each of the plurality of elongated members. Accordingly, each upper portion of each support member panel is supported and retained in an elevated position relative to each base member by at least one support arm, and each upper support portion is adapted for supporting the cooking member in an elevated position relative to the heat source.

Preferably, the apparatus of this embodiment is collapsible and optionally adapted for holding the cooking member in a first elevated cooking position and a second lowered cooking position.

In another embodiment of the portable combination cooking accessory apparatus and cooking member of this aspect of the invention, there is provided that an upright rail portion of at least one of the plurality of base members has formed therein an outer retaining slot at an outer longitudinal extent of the at least one of the plurality of base members. Further, the upright rail portion of at least one of the plurality of base members of this embodiment has formed therein at least one retaining hole centrally located in the upright rail of at least one of the plurality of base members for pivotably retaining the lower portions of each support member. Still further, the upright rail portion of at least one of the plurality of base members has formed therein an intermediate retaining slot located between the outer retaining slot and the retaining holes.

In accordance with another embodiment of this aspect of the disclosure, there is provided a portable combination cooking accessory apparatus and cooking member, wherein each upright rail portion of each base member has formed therein an outer retaining slot at each outer longitudinal extent of each base member. Further, in accordance with this embodiment, each upright rail portion of each base member has formed therein a plurality of retaining holes centrally located adjacent a longitudinal midpoint in each upright rail for pivotably retaining the lower portions of each the support member. Still further, each upright rail portion of each base member has formed therein a plurality of intermediate retaining slots located between the outer retaining slots and the central retaining holes.

In accordance with an embodiment, the portable combination cooking accessory apparatus and cooking member is provided with each support member panel further comprising side rails, or flanges, extending alongside the length of each support member panel, each support member being pivotably attached between the side rails of the support member and the upright rail portion of each base member at the centrally located retaining holes of each rail portion and adjacent the lower portion of each support member. Further, with this embodiment, each at least one support arm comprises a substantially U-shaped arm member having an inwardly extending stub at each upper extent of the U-shaped arm member, each stub being pivotably retained in each side rail adjacent the upper portion of the support member panel, whereas a lower extent of each U-shaped arm member is optionally adapted for being retained during elevated support of the cooking member in the retaining slot at the outermost extents of each elongated base member. Still further, each side rail has intermediate slots corresponding to the intermediate slots of the vertical portions of the base members, when the support members are in a flattened, or collapsed, condition, and the lower extent of each U-shaped arm member is retained during lowered support of the cooking member, or storage of the apparatus wherein the cooking member is both engaged by the lower extent of each U-shaped arm member and retained in the plurality of intermediate slots of the support members and the base members.

In this embodiment of the portable combination cooking accessory apparatus and cooking member, there is provided that, in an upwardly extended position of the plurality of support members, the cooking member is adapted for being supported at least on the stubs of the U-shaped support arms. In a lowered position of the plurality of support members, the cooking member is adapted for being supported on the stubs of each U-shaped support arm and the lower extent of each U-shaped support arm, such that the lower extent of each U-shaped support arm is also retained in the intermediate slots.

The portable combination cooking accessory apparatus and cooking member of this embodiment and aspect of the disclosure provides that the support members form a V-shaped structure for deflecting and re-directing heat from the heat source to and above outer extents of the apparatus to effectively reduce the amount of heat directly accessing a lower surface of the cooking member. This deflecting and reducing serves to effectively route heat to more directly access locations above the cooking member (i.e., near the top of the food, such as a pizza, thereon), and between the cooking member and the hood cover.

Alternatively, there is provided a V-shaped structure of the support members may comprise side members in which a pan may be attached to the bottom of the assembly with one configuration being a small 'V' shaped pan that would fit inside the 'V' shaped support panels described above and which could contain wood or flavor chips that would provide smoke or other enhancements to the taste of the pizza or food being cooked. This pan may be constructed to be leakproof so that water can be added to assist in moisture retention for foods cooked at low temperatures like smoking of meats and vegetables.

Still further, there may be provided a lid prop that may be used to hold the grill lid in place with enough room to check the pizza for doneness or to rotate it for more even cooking without the lid being fully opened and consequently losing much of the heat needed to complete cooking.

In accordance with an embodiment of this aspect of the disclosure, there is provided a portable combination cooking accessory apparatus and cooking member further comprising an end lip, or flange, along an outermost end of each support member panel. The lip helps secure the cooking when in an elevated position. Also, the support member panels are adapted for retaining the cooking member in a storage position with the stubs of each U-shaped support arm adapted for retaining the cooking member in the storage position, and in this storage position the lower extent of each U-shaped support arm is also adapted for retaining the cooking member with a lower extent of each U-shaped support arm engaging the upper surface of the cooking member and another portion of the lower extent of each U-shaped support arm also being retained in an intermediate slot.

The various aspects and embodiments of the disclosure may be used in conjunction with an existing outdoor grill of any fuel type for improved baking of pizzas and other foods requiring even-heat distribution, whether cooking is desired at higher temperatures such as is often preferred for pizza, or at lower temperatures for smoking meats and vegetables. In this way, users are benefited in being able to attain greater use of their outdoor grills to achieve better cooking results, and thereby avoiding some of the hassles and additional cleanup associated with indoor cooking.

Further, the various aspects and embodiments of the disclosure provide for a highly portable apparatus, or apparatus and cooking member combination, wherein the apparatus may be used in different height profiles, depending on available space under a hooded cover for a particular user's outdoor grill, and wherein the apparatus may be easily removed, cleaned, and securely stored for later use.

Whereas baking pizza is one primary use for the invention, many other foods would benefit from cooking in a similar arrangement of uniformly distributed heat in an outdoor grill at a variety of temperatures including meats, vegetables, stews, breads, etc.

It will also be appreciated by those skilled in the art that there are various possible combinations of the above-described elements and sub-elements for various embodiments of the invention, whether such elements and sub-elements be combined in whole or in part, which may be employed without departing from the scope and spirit of the invention as claimed.

The subject matter of the present disclosure is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

DETAILED DESCRIPTION

Figure 1:
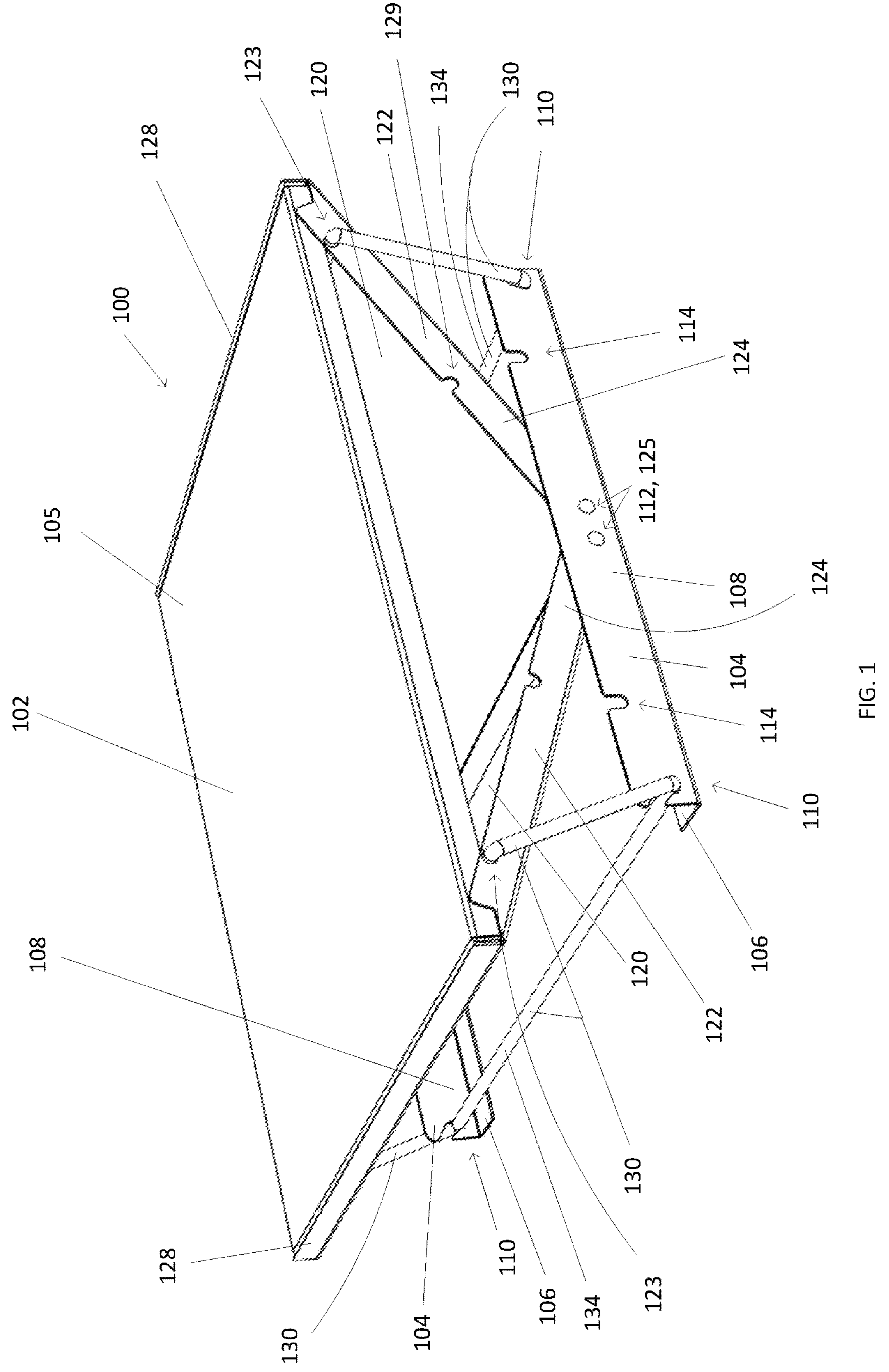
FIG. 1 is a top left perspective view of an embodiment of a portable combination cooking accessory apparatus and cooking member in an elevated position of use in accordance with an aspect and embodiment of the disclosure.
Figure 2:
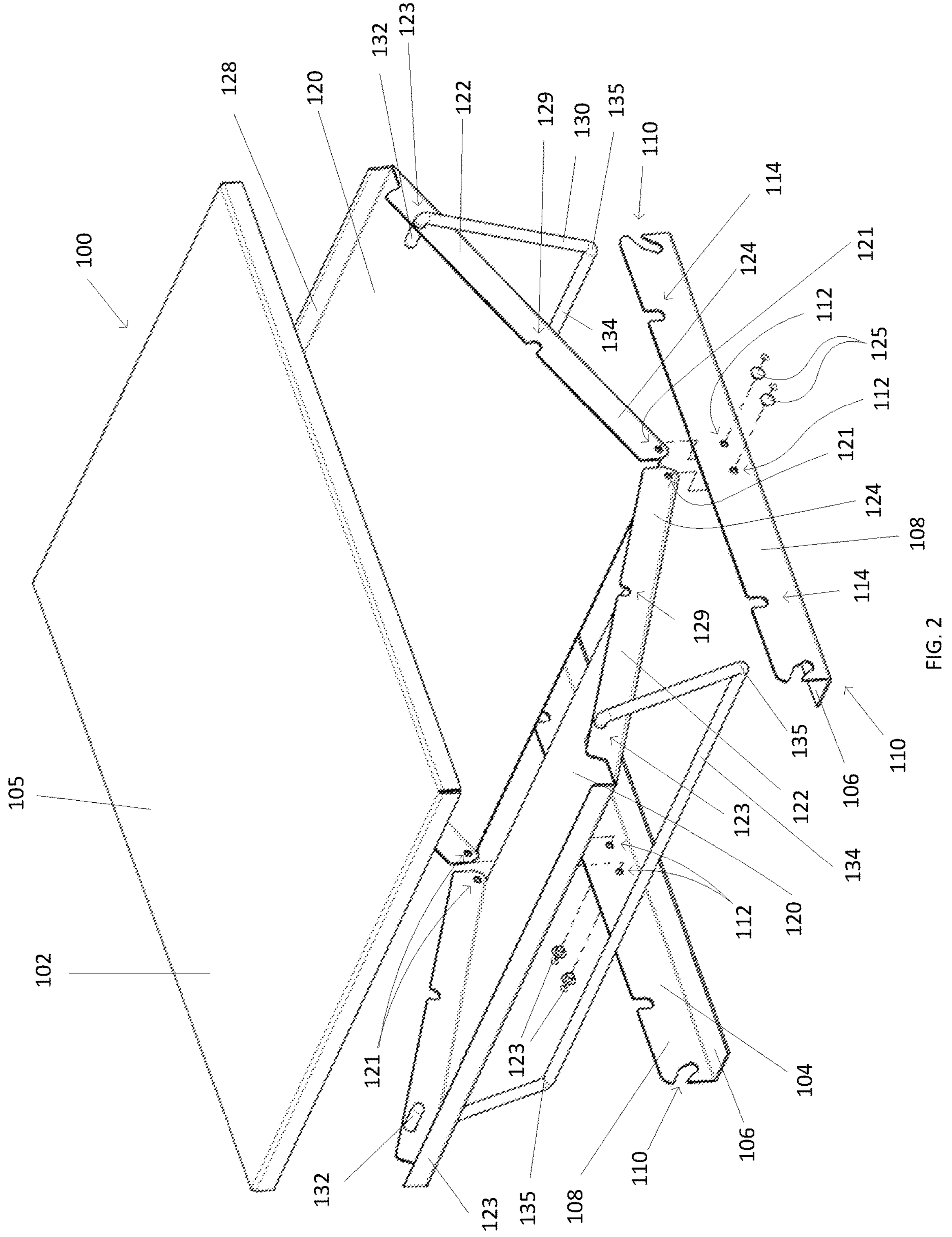
FIG. 2 is an exploded view of the portable combination cooking accessory apparatus and cooking member of FIG. 1.
Figure 8:
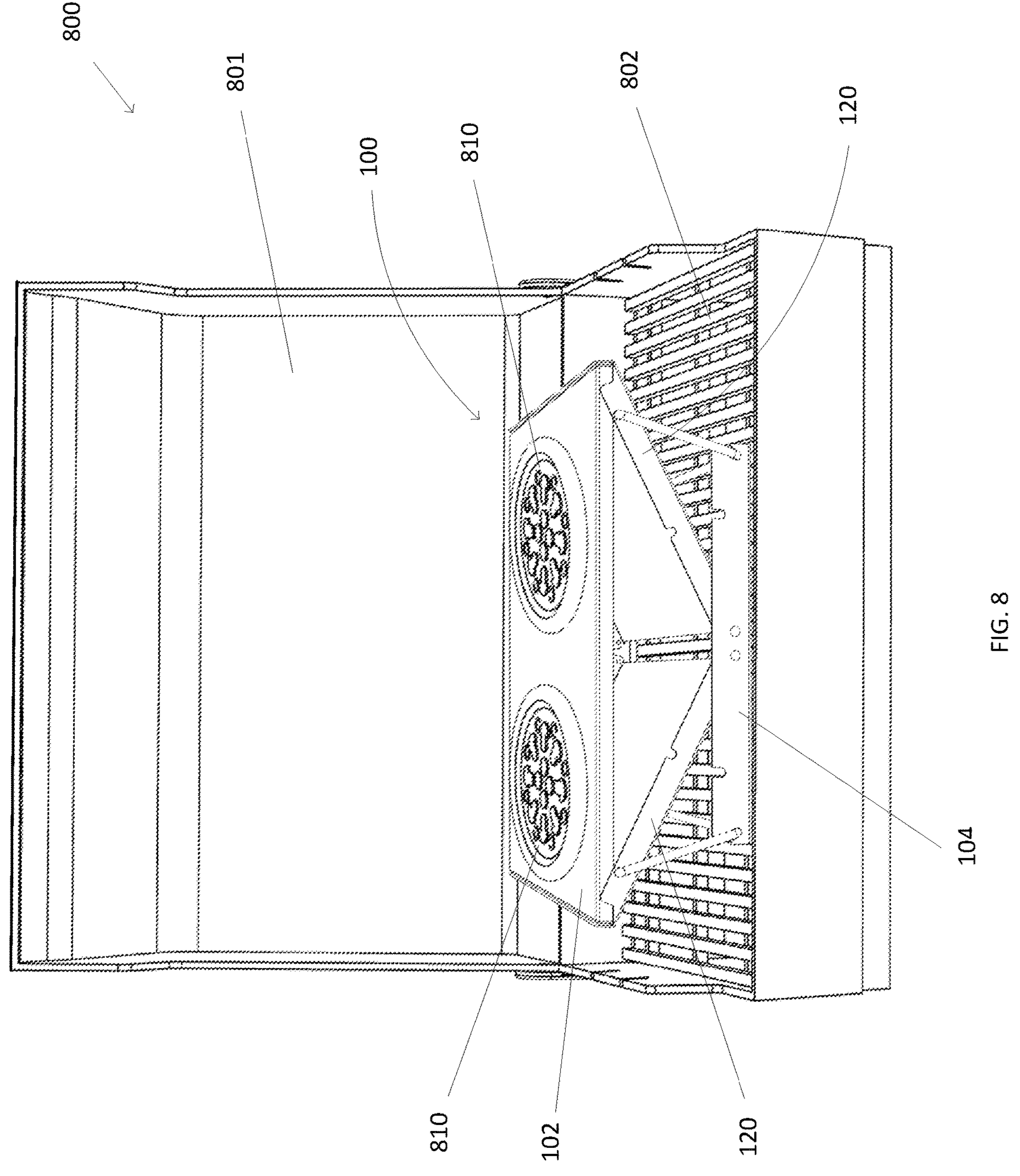
FIG. 8 is a front perspective view of a portable combination cooking accessory apparatus and cooking member shown in an environment of use comprising an outdoor grill with its hood open and with two pizzas on the cooking member ready to be cooked.
Figure 9:
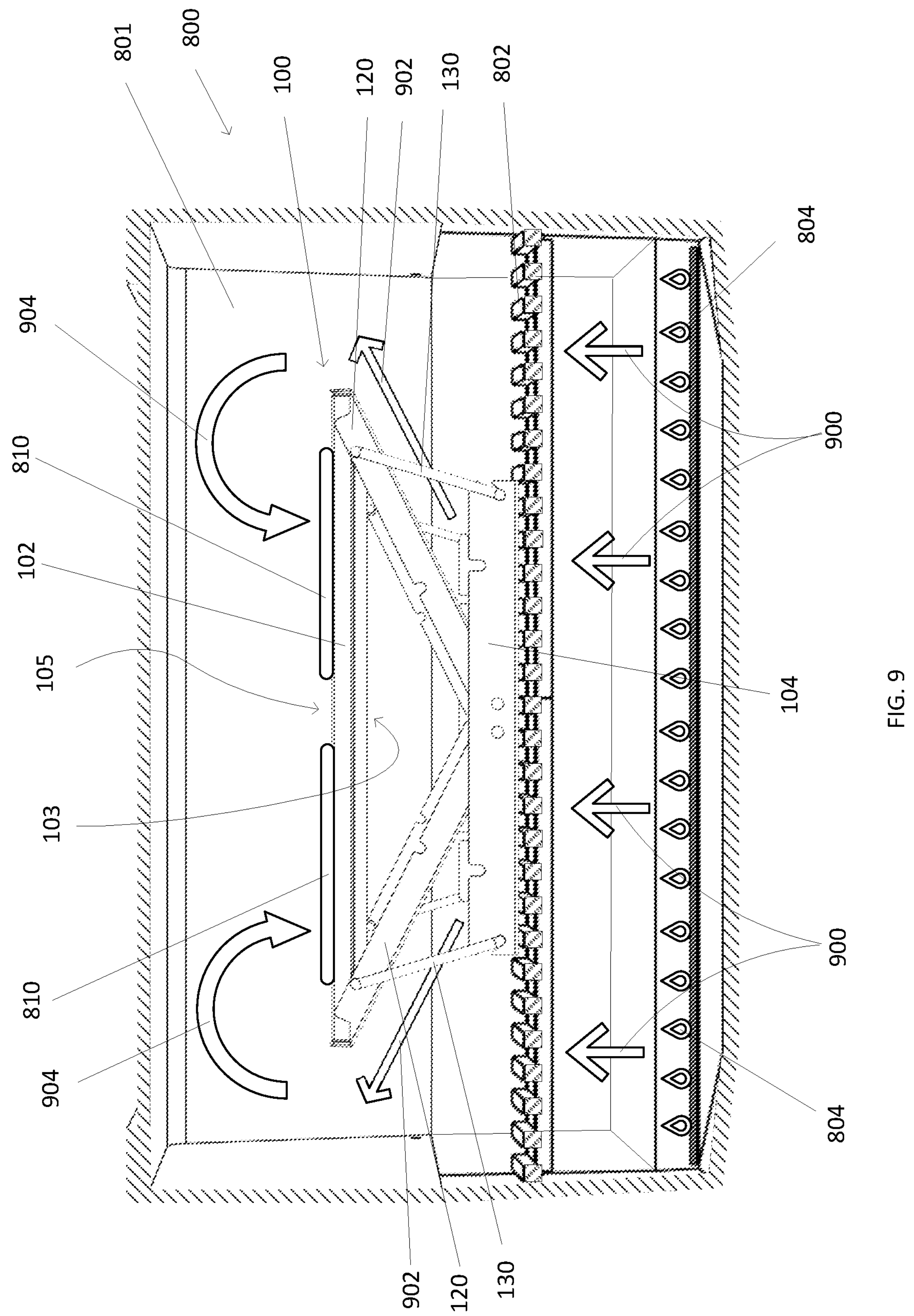
FIG. 9 is a front perspective section view of an outdoor grill with the hood cover closed and having the front thereof removed to show the portable combination cooking accessory apparatus and cooking member, with food items shown thereon, for illustrating how heat from a lower heat source is radiated and directed by support member panels of the apparatus to around and above the cooking member and food to enable even heating and ideal cooking of the food in the outdoor grill.

Referring to FIGS. 1-3A, 4-5, and 7, in accordance with an aspect and embodiment of the disclosure, there is shown in an operational configuration, a portable combination cooking accessory apparatus 100 and cooking member 102 (such as a ceramic backing stone, a metal sheet, an oven-style rack, or other material cooking member) adapted for use on an outdoor grill 800, or other cooking surface, having a hood cover 801 (see also FIGS. 8 and 9). The combination apparatus 100 and cooking member 102 comprises a plurality of base members 104 adapted for residing on a grilling surface 802 of the outdoor grill 800 above a heat source 804 (see FIG. 9), and a plurality of support member panels 120 adapted to be used in an upwardly extended, elevated, position as shown in FIG. 1, wherein the support members are extended away from the base members 104 and the heat source 804, and wherein the support members are adapted for holding the cooking member 102 in an elevated position relative to the heat source.

Each base member 104 preferably comprises, in an integral angular member, a horizontal base portion 106 and a vertical upright portion 108. The vertical upright portion 108 of each base member 104 preferably comprises outer slots 110, with such an outer slot formed near the end of each base member. Further, the vertical upright portion 108 of each base member 104 also preferably comprises a plurality of central holes 112 for pivotably retaining lower portions 124 of each support member panel 120. Still further, each vertical portion 108 of each base member 104 further comprises a plurality of intermediate notches, or slots, 114. The support members 120 (and other portions of the aforementioned apparatus 100) may be made of stainless steel sheet metal and form a "V" shape in an elevated operational configuration.

Figure 4:
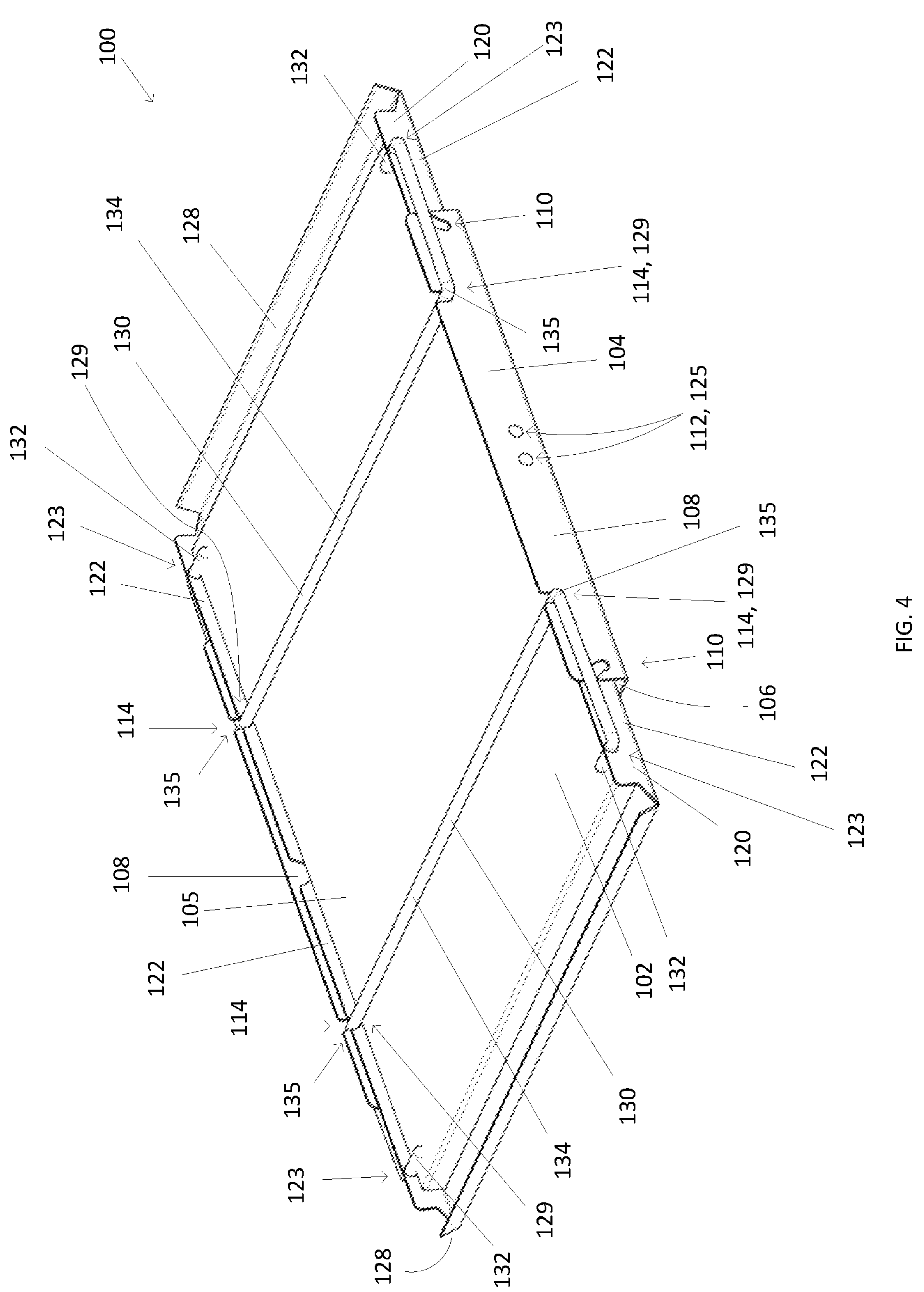
FIG. 4 is a front left perspective view of the embodiment of the portable combination cooking accessory apparatus and cooking member of FIGS. 1-3A in a collapsed position of use suitable for storage of the combination apparatus and cooking member.
Figure 6:
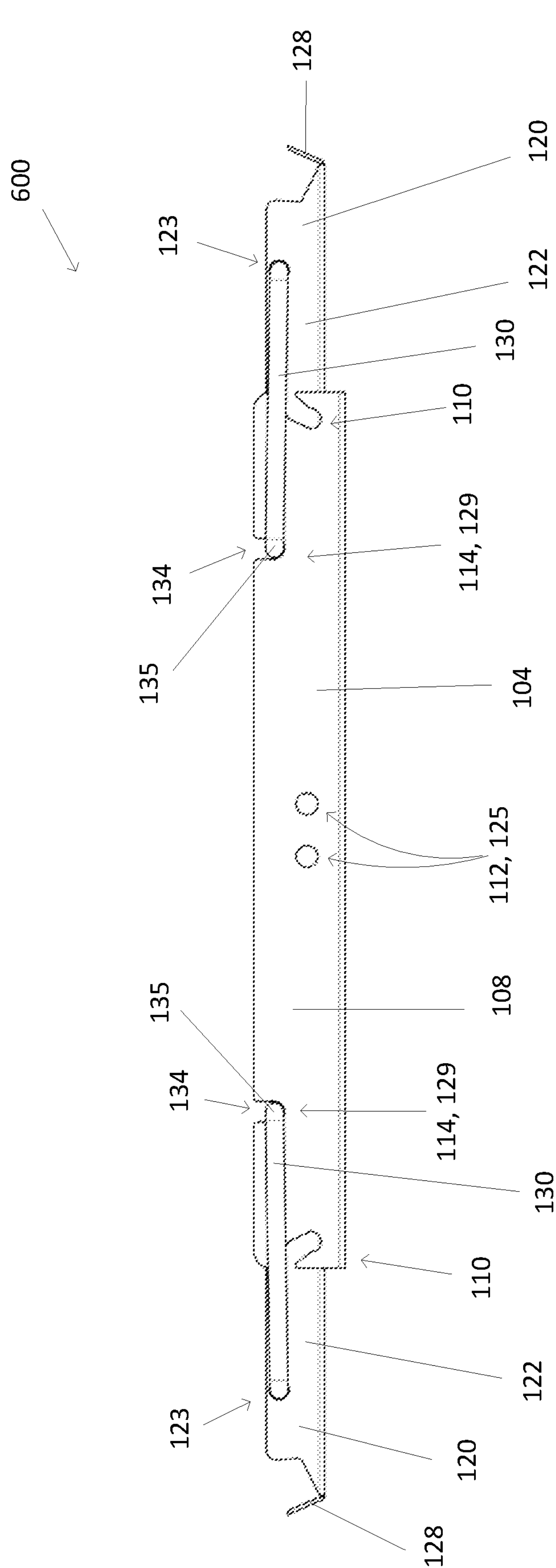
FIG. 6 is a front isometric view of the portable cooking accessory apparatus adapted for use with a cooking member as viewed in a collapsed position ready for storage.
Figure 7:
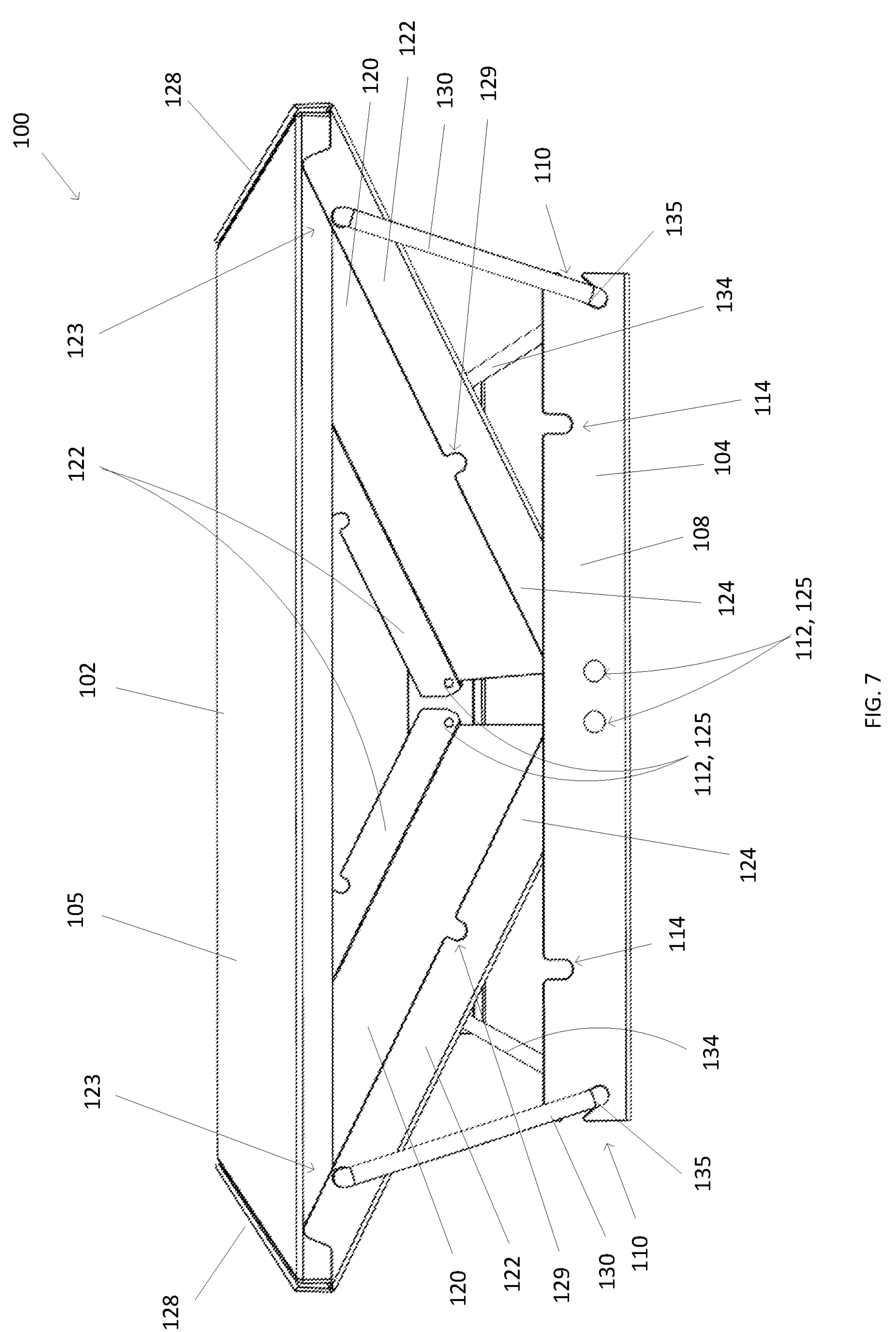
FIG. 7 is a front perspective view of the portable combination cooking accessory apparatus and cooking member of FIGS. 1-5 in an extended position of use on a outdoor grill ready for cooking food.

Each of the support member panels 120 of the portable combination cooking apparatus 100 and cooking member 102 further preferably comprises a rail, or flange, portion 122. The rail portions 122 preferably defines holes 121 (see FIG. 2) adapted for pivotably pinning, as for example with rivets 125 or other pivotable interconnection screw or pin, the rail portions to the holes 112 of the base members. Further, each rail portion 122 preferably defines a hole 123 near an end of each rail member and an intermediate notch 129 adapted to be co-aligned with intermediate notch 114 of each base member when the support members 120 are in a collapsed position (i.e., as shown in FIGS. 4 and 6).

Thus, in this embodiment, the support member panels 120 preferably have formed rails 122, or flanges, on the sides. The rails 122, and hence the support member panels 120 themselves, are each supported by a preferably U-shaped support arm 130, each U-shaped support am having an upper extent portion comprising a stub portion 132 extending inwardly at an upper portion of each U-shaped arm, and a lower extent portion 134 interconnecting at a lower right-angle portion 135 of each U-shaped arm. Each U-shaped arm 130 is pivotably interconnected at the stub portion 132 thereof in holes 123 via a fixed pin interconnection of the stubs 132, as for example with a pivotable force-fit or a kotter pin or leaf-type pin pivotable interconnection, to the respective rail, or flange, 122.

The lower extent portions 134, especially at corner portions 135 thereof, are adapted for being easily removably retained in the first slots 110 of each vertical portion member 108 of each base member 104. These slotted connections are designed for fast release to facilitate a quick transition from a stored position wherein the support panel members 120 may be pivoted from an elevated, V-angled, position, to a collapsed horizontal position (shown in FIGS. 4-6), thereby reducing the profile of the assembly for use in lower profile grills 800, and/or to reduce the space needed for storage.

The aforementioned pin and slot quick connection method may be enabled by reversing the pin and slot locations to the opposite of the presently described preferred embodiment, or other quick release methods may be employed in place of the slotted connection by those skilled in the art without departing from the spirit of the invention as claimed. When the support member panels 120 are rotated in an upper operational position, as shown for example in FIG. 1, and secured by engaging the support arms 130 to the slots 110, a cooking member 102, such as baking stone, a metal cooking sheet, or an oven-style rack, may be placed to rest on the stubs 132. It will be appreciated that the support stubs 132 may be extended to interconnect with each other to form a rod, or similar structural member, traversing across each of the panels 120 to provide an additional support surface for the cooking member 102.

At the end of each support panel member 120, there is preferably formed a lip 128, or flange, preferably formed contiguous with each support panel member. Lips 128 at the top and on the sides of each support member panel 120 also aid in containment of the cooking member 102 on multiple sides thereof (i.e., together with side rails 122 at the sides of a baking stone, a baking sheet, or an oven-style rack), both when in an operational configuration or position as shown in FIGS. 1-3A and 7-10, and when in a storage configuration or position, as shown in FIG. 6. As suggested in FIG. 5, the portable combination cooking accessory 100 and cooking member 102 may also be used in a lowered position, where for example perhaps less heat is desired on top of the food, or where a lower-profile hood cover of an outdoor grill 800 is encountered.

Figure 3A:
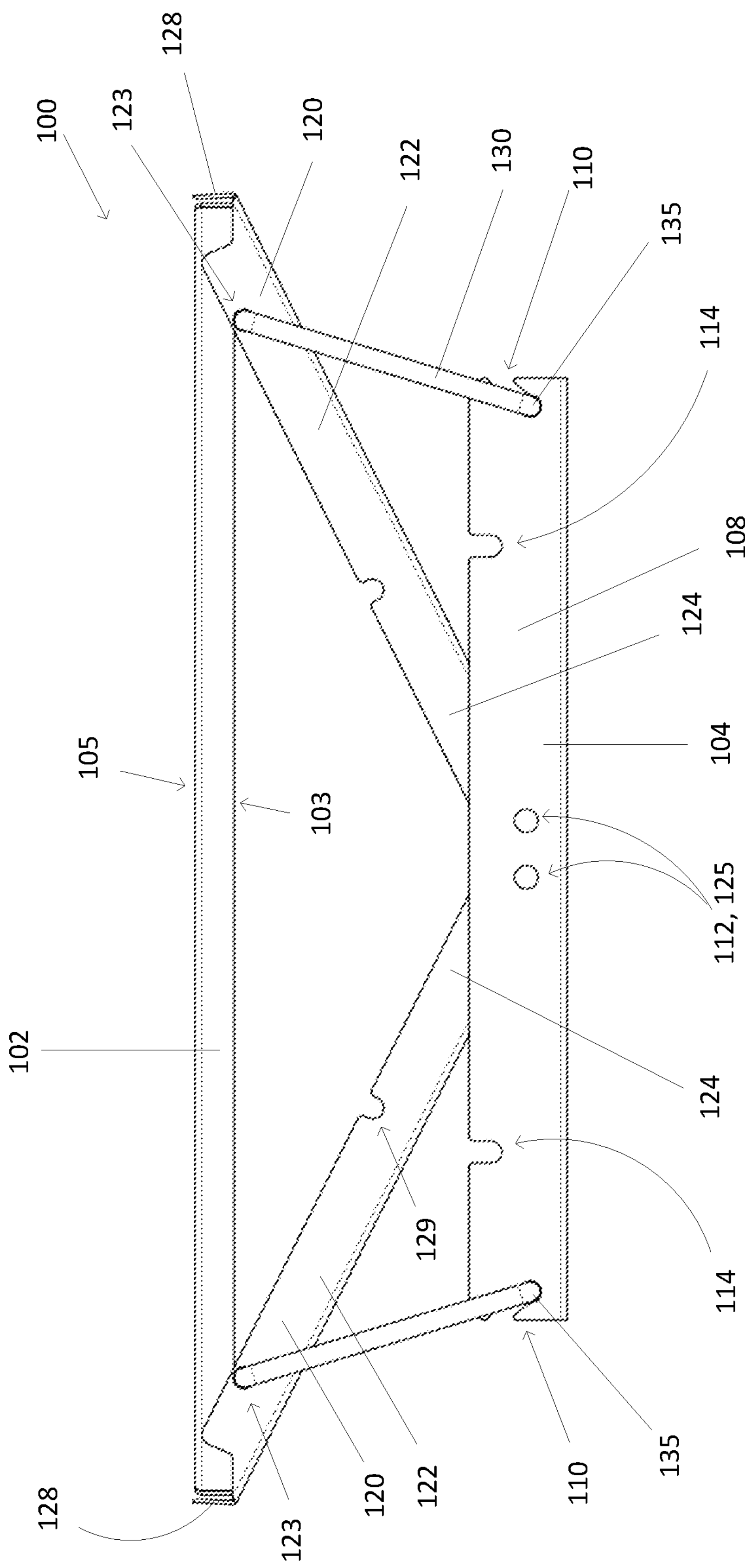
FIG. 3A is an isometric front view of the embodiment of the portable combination cooking accessory apparatus and cooking member of FIGS. 1 and 2 in an elevated position of use.
Figure 3B:
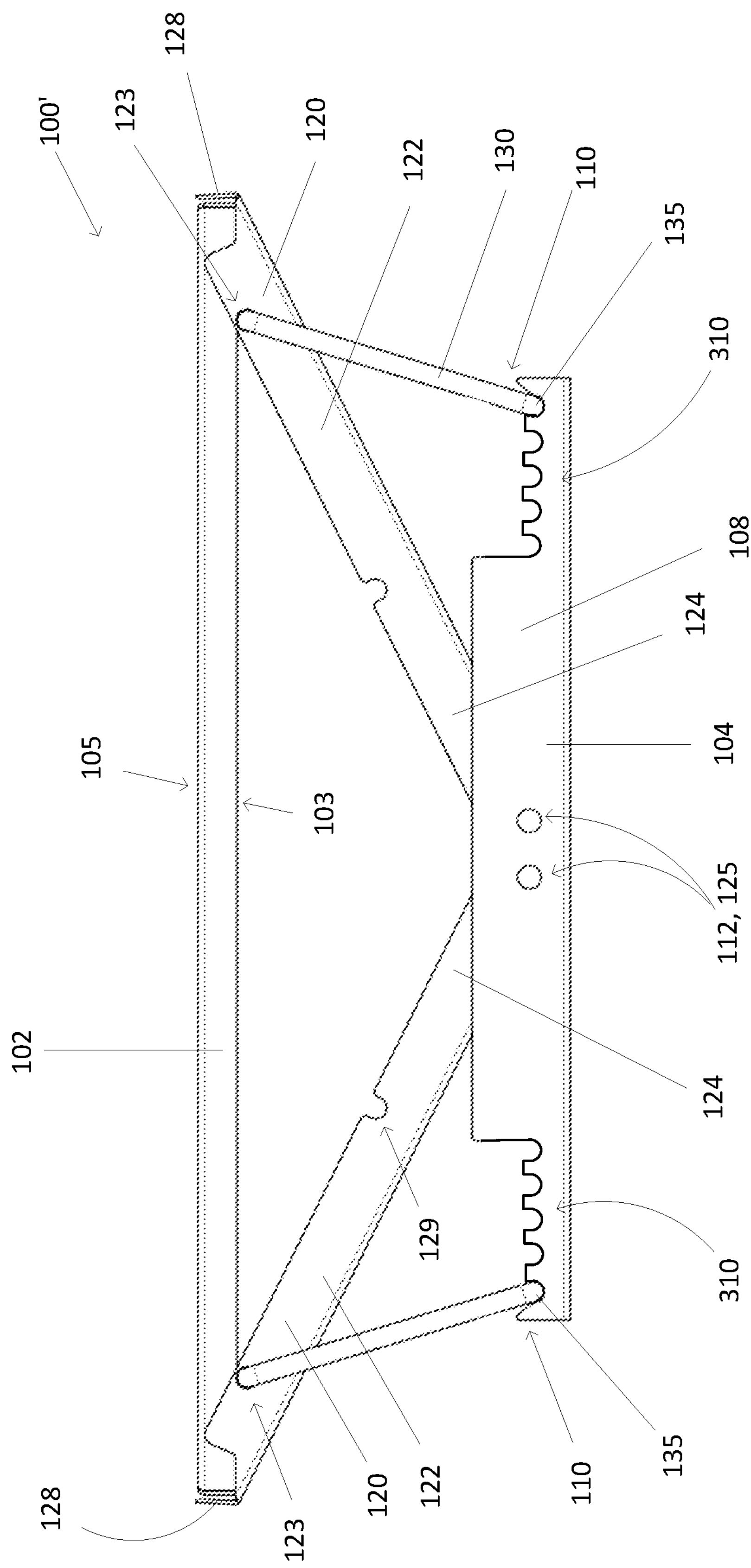
FIG. 3B is an isometric front view of an alternative embodiment of a portable combination cooking accessory apparatus and cooking member allowing for a plurality of different heights of use.

As shown in FIG. 3B, there is provided an alternative embodiment of a portable combination cooking accessory apparatus and cooking member 100', wherein the apparatus 100' comprises all of the same members as that described in connection with the apparatus 100 of FIGS. 1-3A, 4-5, and 7, except that apparatus 100' further provides for a plurality of different operational cooking heights of the apparatus, for example to accommodate different cooking temperature needs for different foods, different heat source characteristics, and/or to accommodate different sizes of outdoor grills 800. Thus apparatus 100' further comprises a plurality of additional slots 310 adapted for allowing adjustability of the location of the arms 130 to accommodate different height levels of the cooking member 102 as will be appreciated by those skilled in the art.

It will be further appreciated by those skilled in the art that other methods of supporting the cooking member 102 on the support panel members 120 during use, or containing and securing the cooking member during storage, may be employed without departing from the spirit and scope of the invention as claimed.

Referring now specifically to FIG. 8, there is shown a view that a user of the portable combination cooking accessory 100 and cooking member 102 would see when lifting a grill hood 801 as the combination apparatus and cooking member sits on a grill surface 802. Thus, it may be seen from FIG. 8 that the base members 104 provide a stable base for the apparatus 100 on the grill surface 802 right above the heating source (seen further in FIG. 9), and how food items, such as pizzas 810, may be cooked on the upper surface 105 of the cooking member 102.

Referring now further to FIG. 9, it can be seen with the cutaway view presented that the apparatus 100 elevates the cooking member 102, together with food items 810 thereon, higher away from the heat source 804, and such that the heat is aided in being directed as shown by arrows 900, 902, 904 as further described below. Thus, it will be appreciated that the support panel members 120 in a V-shaped elevated configuration serve to re-direct heat 900 from the heat source 804 as shown by arrows 902, with the heat being redirected upwardly and at an angle away from a bottom portion 103 of the cooking member 102.

Thus, the heat is directed as shown by arrows 902 and 904 to a location that is shown moving around the ends of the cooking member 102, and in front of and behind the support panel members 120, upwardly to within the reduced space, because of the elevation by the apparatus 100, between the top of the food item 810 and the upper inside of the hood cover 801. In this way, less heat is allowed to directly access the bottom 103 of the cooking member 102, and more heat is redirected to the top of the food item and the cooking member 102. In this way the food item becomes more effectively cooked to a desirable temperature, such that, for example with a pizza, the pizza crust is not overcooked and the top portion of the pizza is perfectly cooked.

Figure 5:
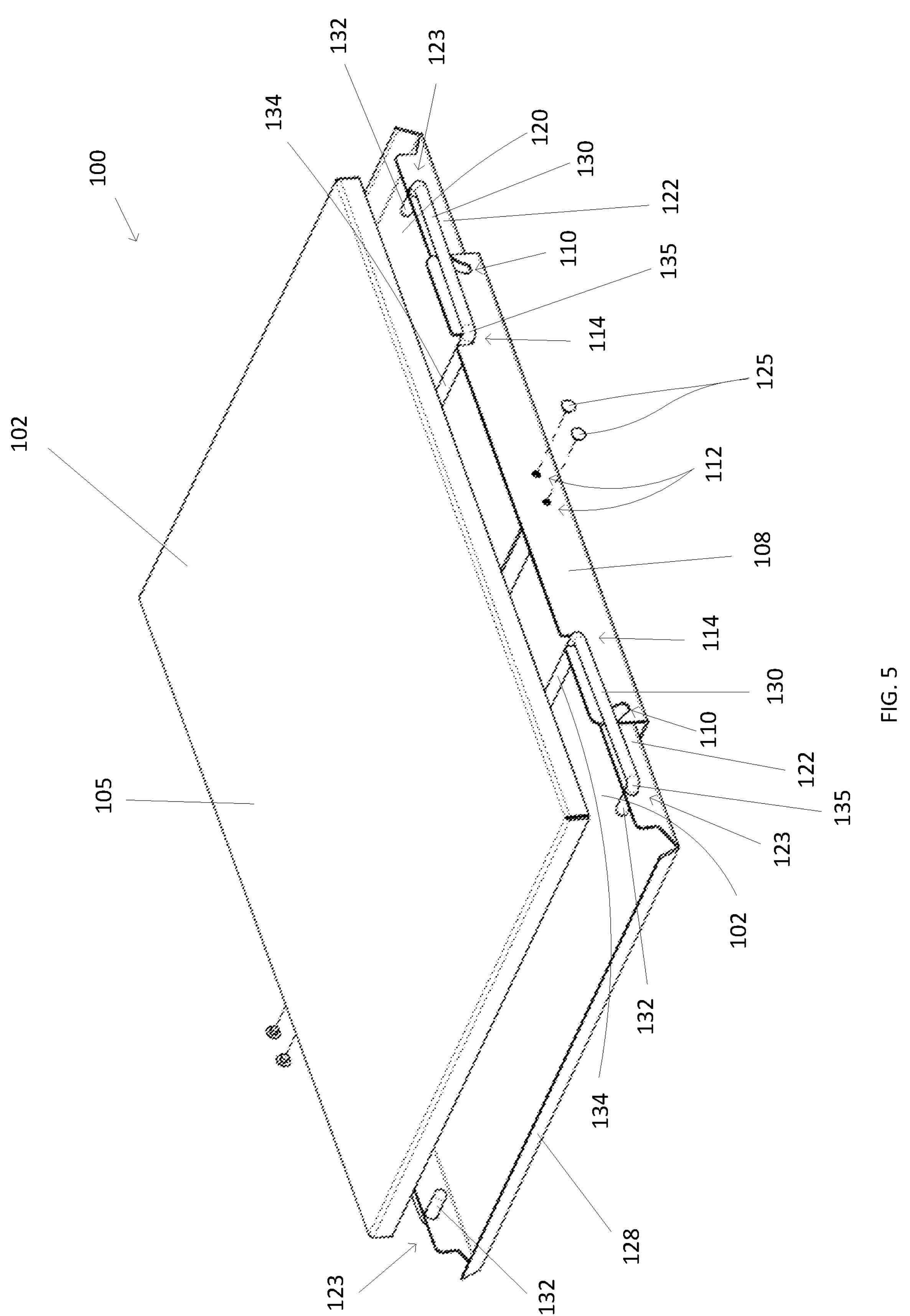
FIG. 5 is a partially-exploded front left perspective view of the portable combination cooking accessory apparatus and cooking member of FIGS. 1-4 in a collapsed position adaptable for use in a lower-profile hooded outdoor grill in accordance with an aspect and embodiment of the disclosure.

Referring specifically to FIG. 5, the combination cooking accessory apparatus 100 and cooking member 102 is shown in an alternative, lowered position, wherein a lower surface 103 (see FIG. 9) of the cooking member 102 is adapted for resting both on the stubs 132 of the support arms 130 and the lower extent portions 134 of the support arms in the lowered cooking position. As mentioned previously, this alternative cooking position may provide the benefit of lower profile cooking in an outdoor grill 800 not having sufficient clearance under the hood cover 801 for cooking with the apparatus 100 in a fully-extended position as described above.

Referring to FIGS. 4 and 6, the portable cooking accessory apparatus 100 is shown in a fully collapsed position suitable for storing the cooking combination apparatus 100 and cooking member 102 (as shown in FIG. 4). In the storage position, the cooking member 102 is retained between the rails 122 and the lips 128 of the support panel members 120, with the lower extent portions 134 of the U-shaped arms pivoted about pivot points 123, i.e., holes 123, having stub portions 132 retained therein, such that the lower extent portions 134 of the support arms 130 are retained in the co-aligned notches 129 and 114, the lower extent portions of the support arms serving also to engage the upper side 105 of the cooking member 102 as shown in FIG. 4 to help hold the cooking member in the recession created by rails 122 and lips 128. In this flattened configuration, the combination apparatus 100 and cooking member 102 maybe easily stored on a shelf without taking up very much space at all.

During setup for use, the apparatus 100 is placed on a flat surface, the support panel members 120 are raised to a position where they form a V-shaped configuration, and the support arms 130 are placed in slots 110 in the base members. Thereafter, the cooking member 102 is placed for final operational configuration. When complete, the entire assembly is placed on the grill and ready for use. Disassembly is the reverse of the steps for the operational configuration. For disassembly, the cooking member 102 is first removed (after it has cooled down), the support arms 130 are rotated out of slots 110, and the support member panels 120 are rotated down to a horizontal position. The cooking member 102 may then be placed on top of the collapsed assembly 100, or as shown in FIG. 4 with the cooking member 102 under the stubs 132 and the arms 130 pivoted to retain the cooking member with their lower extents 134 engaging and holding the cooking member between side rails 122 and lips 128, for storage.

Figure 10:
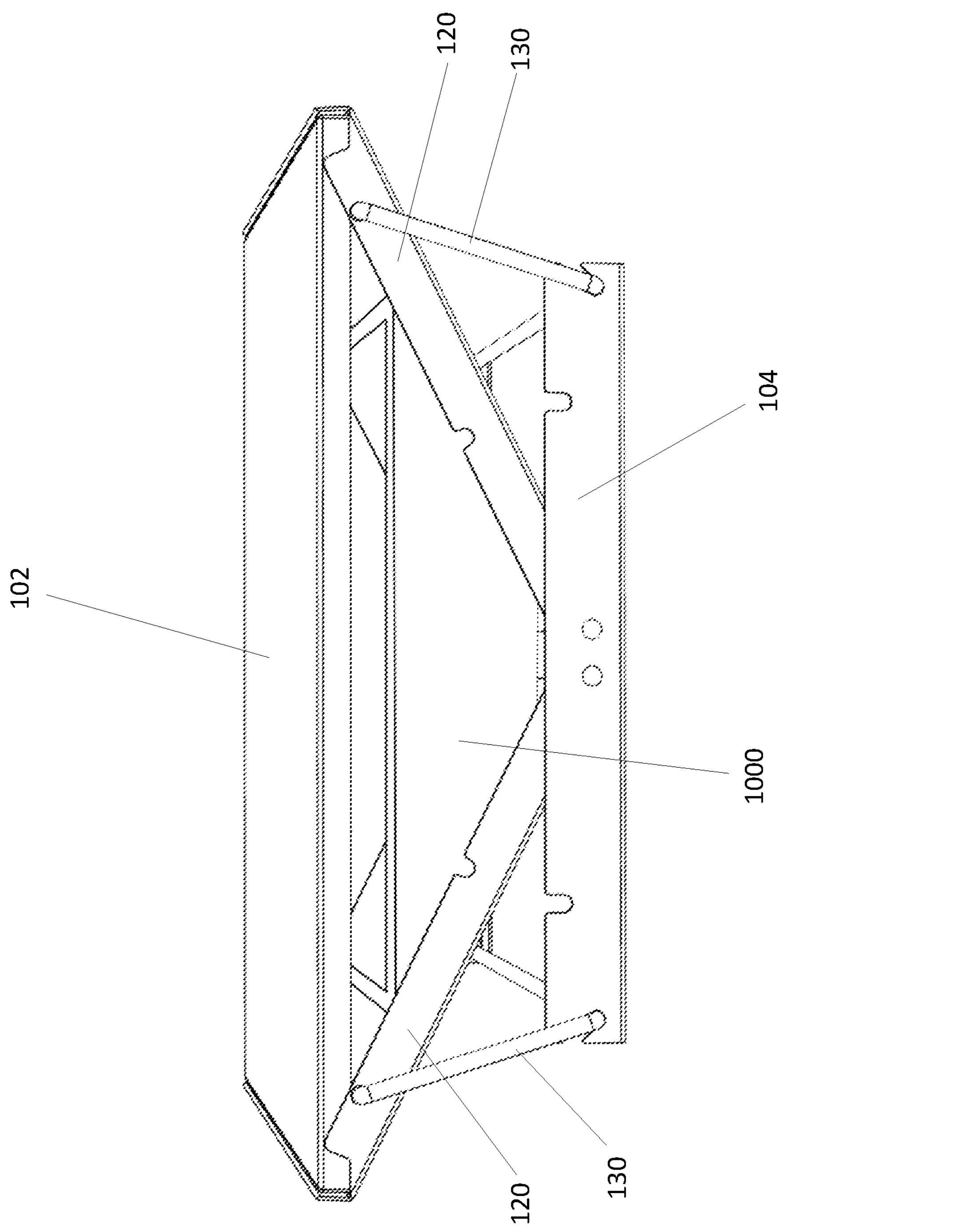
FIG. 10 is a front perspective view of the portable combination cooking accessory apparatus and cooking member of FIGS. 1-5, further comprising a tray member for retaining wood chips or water.

Referring now specifically to FIG. 10, there is provided a portable combination cooking accessory apparatus 100 and cooking member 102, further comprising an optional tray member 1000 adapted for retaining water and/or wood chips for providing smoke flavor and steam to help flavor and tenderize foods cooked.

The presently described and claimed device provides an apparatus for use on an existing outdoor grill of any fuel type and solves the issues associated with prior-art apparatus. The present apparatus improves on prior art apparatus, since it emulates the ideal conditions of a traditional brick oven pizza oven, but allows for such ideal pizza (and other food) cooking conditions with virtually any outdoor grill.

While preferred embodiments of the present invention have been shown and described, it will be apparent to those skilled in the art that many changes and modifications may be made without departing from the invention in its broader aspects. For example, it will be appreciated that one of ordinary skill in the art may mix and match the various components of the various embodiments of the invention without departing from the true spirit of the invention as claimed. The appended claims are therefore intended to cover all such changes and modifications as fall within the true spirit and scope of the invention.

What is claimed is:

1. A portable cooking accessory apparatus for facilitating ideally heating or smoking of food items when used with a heatable cooking member on an outdoor grill or other cooking surface having a hood cover, comprising:

at least one base member for resting on the grill or other cooking surface above a heat source of the outdoor grill or other cooking surface; and a support member pivotably attached to said at least one base member and extending away from said at least one base member and the heat source, said support member comprising at least one cooking member support portion for holding the cooking member in an elevated position relative to the heat source, and a plurality of angularly-oriented heat-deflecting support member panels, wherein when the cooking member is held in the elevated position, the plurality of angularly-oriented heat-deflecting support member panels in conjunction form a V-shaped structure positioned underneath the cooking member that deflects and re-directs heat from the heat source to and above outer extents of said apparatus, reducing heated air from directly accessing a bottom surface of the cooking member while effectively routing heated air to move from the heat source to over a top surface of the cooking member and between the hood cover and the top surface of the cooking member, and wherein said support member, the cooking member support portion, and the plurality of angularly-oriented heat-deflecting support member panels are collapsible into a flattened configuration as said support member and the plurality of angularly-oriented heat-deflecting support member panels pivot relative to said at least one base member.

2. The portable cooking accessory apparatus of claim 1, wherein said at least one base member comprises a plurality of elongated members, each elongated member having a flat horizontal surface for resting on the grill or other cooking surface, and each elongated member extending upwardly from the flat horizontal surface to form an upright rail portion for interconnecting with said support member.

3. The portable cooking accessory apparatus of claim 2, wherein each support member panel of the plurality of angularly-oriented heat-deflecting support member panels ha s a lower portion and an upper portion, wherein the at least one cooking member support portion of said support member is a plurality of cooking member support portions and each cooking member support portion is comprised of the upper portion of each support member panel, each support member panel being attached at its lower portion to each upright rail portion of each of the plurality of elongated members of said at least one base member, each upper portion of each support member panel being supported and retained in an elevated position relative to each of the plurality of elongated members of said at least one base member by at least one support arm, and each upper portion supporting the cooking member in the elevated position relative to the heat source.

4. The portable cooking accessory apparatus of claim 3, wherein said apparatus is collapsible and holds the cooking member in a first elevated position and at least a first lowered position.

5. The portable cooking accessory apparatus of claim 2, wherein the upright rail portion of each elongated member of the plurality of elongated members of said at least one base member has formed therein an outer retaining slot at an outer longitudinal extent of the upright rail portion of each elongated member, wherein the upright rail portion of each elongated member has formed therein at least one retaining hole centrally located in the upright rail portion of each elongated member for pivotably retaining a lower portion of said support member, and wherein the upright rail portion of each elongated member has formed therein an intermediate retaining slot located between the outer retaining slot and the at least one retaining hole.

6. The portable cooking accessory apparatus of claim 4, wherein each upright rail portion of each elongated member of the plurality of elongated members of said at least one base member has formed therein an outer retaining slot at each outer longitudinal extent of each upright rail portion of each elongated member, wherein each upright rail portion of each elongated member has formed therein a plurality of retaining holes centrally located in each upright rail portion of each elongated member for pivotably retaining the lower portion of each support member panel of the plurality of angularly-oriented heat-deflecting support member panels of said support member, and wherein each upright rail portion of each elongated member has formed therein a plurality of intermediate retaining slots located between the outer retaining slot and the plurality of retaining holes.

7. The portable cooking accessory apparatus of claim 6, wherein each support member panel of the plurality of angularly-oriented heat-deflecting support member panels of said support member further comprises side rails extending alongside a length of each support member panel, each support member panel being pivotably attached between the side rails of the support member panel and the upright rail portion of each elongated member of the plurality of elongated member of said at least one base member at the at least one of the plurality of retaining holes of each upright rail portion and adjacent the lower portion of each support member panel, and wherein each at least one support arm of the upper portion of each support member panel comprises a substantially U-shaped arm member having an inwardly extending stub at each upper extent of the U-shaped arm member, each stub being pivotably retained in each side rail adjacent the upper portion of each support member panel, a lower extent of each U-shaped arm member being retained during elevated support of the cooking member in the outer retaining slot at outermost extents of each upright rail portion and being retained during lowered support of the cooking member, or storage of the apparatus, in the plurality of intermediate retaining slots.

8. The portable cooking accessory apparatus of claim 7, wherein in an upwardly extended position of the plurality of support member panels of said support member the cooking member is being supported at least on the stub of each U-shaped arm member of the at least one support arm and wherein in a lowered position of the plurality of support member panels the cooking member is supported on the stub of each U-shaped arm member and the lower extent of each U-shaped arm member, wherein the lower extent of each U-shaped arm member is retained in the plurality of intermediate retaining slots.

9. The portable cooking accessory apparatus of claim 8, further comprising an end lip along an outermost end of the upper portion of each support member panel of the plurality of angularly-oriented heat-deflecting support member panels of said support member, wherein the support member panels retain the cooking member in a storage position with the stub of each U-shaped-arm member of the at least one support arm, and wherein the lower extent of each U-shaped arm member also retains the cooking member in the storage position with the lower extent of each U-shaped arm member also being retained in one of the plurality of intermediate retaining slots.

10. A portable combination cooking accessory apparatus and cooking member adapted for facilitating even heating or smoking of food items when used on an outdoor grill or other cooking surface having a hood cover, comprising:

at least one base member for resting on the grill or other cooking surface above a heat source of the outdoor grill or other cooking surface;

a cooking member held in a cooking position or a storage position; and a support member pivotably attached to said at least one base member and extending away from said at least one base member and the heat source, said support member comprising at least one cooking member support portion holding said cooking member in an elevated position relative to the heat source, and a plurality of angularly-oriented heat-deflecting support member panels, wherein when the cooking member is held in the elevated position, the plurality of angularly-oriented heat-deflecting support member panels in conjunction form a V-shaped structure positioned underneath said cooking member that deflects and re-directs heat from the heat source to and above outer extents of said apparatus, reducing heated air from directly accessing a bottom surface of said cooking member while effectively routing heated air to move from the heat source to over a top surface of said cooking member and between the hood cover and the top surface of said cooking member, and wherein said support member, the cooking member support portion, and the plurality of angularly-oriented heat-deflecting support member panels are collapsible into a flattened configuration as said support member and the plurality of angularly-oriented heat-deflecting support member panels pivot relative to said at least one base member.

11. The portable combination cooking accessory apparatus and cooking member of claim 10, wherein said at least one base member further comprises a plurality of elongated members each having a flat horizontal surface for resting on the grill or other cooking surface, and each elongated member extending upwardly from the flat horizontal surface to form an upright rail portion for interconnecting with said support member.

12. The portable combination cooking accessory apparatus and cooking member of claim 11, wherein each support member panel of the plurality of angularly-oriented heat-deflecting support member panels ha s a lower portion and an upper portion, wherein the at least one cooking member support portion of the support member is a plurality of cooking member support portions and each cooking member support portion is comprised of the upper portion of each support member panel, each support member panel being attached at its lower portion to each upright rail portion of each of the plurality of elongated members, each upper portion of each support member panel being supported and retained in an elevated position relative to each of the plurality of elongated members of said at least one base member by at least one support arm, and each upper portion supporting said cooking member in the elevated position relative to the heat source.

13. The portable combination cooking accessory apparatus and cooking member of claim 12, wherein said apparatus is collapsible and holds said cooking member in a first elevated cooking position and at least a second lowered cooking position.

14. The portable combination cooking accessory apparatus and cooking member of claim 11, wherein the upright rail portion of at least one of the plurality of elongated members of said at least one base member has formed therein an outer retaining slot at an outer longitudinal extent of the upright rail portion of each elongated member, wherein at least one upright rail portion of each elongated member has formed therein at least one retaining hole centrally located in the upright rail portion of each elongated member for pivotably retaining a lower portion of said support member, and wherein the upright rail portion of each elongated member has formed therein an intermediate retaining slot located between the outer retaining slot and the at least one retaining hole.

15. The portable combination cooking accessory apparatus and cooking member of claim 13, wherein each upright rail portion of each elongated member of the plurality of elongated members of said at least one base member has formed therein an outer retaining slot at each outer longitudinal extent of each upright rail portion of each elongated member, wherein each upright rail portion of each elongated member has formed therein a plurality of retaining holes centrally located in each upright rail portion of each elongated member for pivotably retaining the lower portions of each support member panel of the plurality of angularly-oriented heat-deflecting support member panels of said support member, and wherein each upright rail portion of each elongated member has formed therein a plurality of intermediate retaining slots located between the outer retaining slot and the plurality of retaining holes.

16. The portable combination cooking accessory apparatus and cooking member of claim 15, wherein each support member panel of the plurality of angularly-oriented heat-deflecting support member panels of said support member further comprises side rails extending alongside a length of each support member panel, each support member panel being pivotably attached between the side rails of the support member panel and the upright rail portion of each elongated member of the plurality of elongated member of said at least one base member at the at least one of the plurality of retaining holes of each upright rail portion and adjacent the lower portion of each support member panel, and wherein each at least one support arm of the upper portion of each support member panel comprises a substantially U-shaped arm member having an inwardly extending stub at each upper extent of the U-shaped arm member, each stub being pivotably retained in each side rail adjacent the upper portion of each support member panel, a lower extent of each U-shaped arm member being retained during elevated support of said cooking member in the outer retaining slot at outermost extents of each upright rail portion and being retained during lowered support of said cooking member, or storage of the apparatus, in the plurality of intermediate retaining slots.

17. The portable combination cooking accessory apparatus and cooking member of claim 15, wherein in an upwardly extended position of the plurality of support member panels of the plurality of angularly-oriented heat-deflecting support member panels of said support member said cooking member is being supported at least on the stub of the U-shaped support arm member of the at least one support arm and wherein in a lowered position of the plurality of support member panels said cooking member is adapted for being supported on the stub of each U-shaped support arm member and the lower extent of each U-shaped support arm member, wherein the lower extent of each U-shaped support arm member is retained in the plurality of intermediate retaining slots.

18. The portable combination cooking accessory apparatus and cooking member of claim 17, further comprising a tray member holding water for steaming or wood chips for smoking foods to be cooked.

* * * * *